(12) United States Patent
Ma et al.

(10) Patent No.: US 8,086,777 B2
(45) Date of Patent: Dec. 27, 2011

(54) MULTIMEDIA SYSTEM

(75) Inventors: Mou-Ming Ma, Taipei (TW); Li-Chih Hsieh, Taipei (TW); Min-Yu Chou, Taipei (TW); Yih-Neng Lin, Taipei (TW); Chun-Kun Lan, Taipei (TW); Cheng-Hao Huang, Taipei (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 116 days.

(21) Appl. No.: 12/648,916

(22) Filed: Dec. 29, 2009

(65) Prior Publication Data

US 2011/0099315 A1    Apr. 28, 2011

(30) Foreign Application Priority Data

Oct. 22, 2009  (TW) ................................ 98135748 A

(51) Int. Cl.
*G06F 13/00* (2006.01)
*G06F 11/30* (2006.01)
(52) U.S. Cl. ....................... 710/300; 713/340
(58) Field of Classification Search .......... 710/300–306; 713/300, 340
See application file for complete search history.

(56) References Cited

U.S. PATENT DOCUMENTS

| | | | | |
|---|---|---|---|---|
| 5,461,717 A * | 10/1995 | Notarianni et al. | ........... | 710/303 |
| 5,987,244 A * | 11/1999 | Kau et al. | ............. | 713/500 |
| 6,044,215 A * | 3/2000 | Charles et al. | ........... | 703/25 |
| 6,209,105 B1 * | 3/2001 | Hamamoto | .............. | 713/300 |
| 6,216,184 B1 * | 4/2001 | Fackenthall et al. | ........ | 710/301 |
| 6,282,595 B1 * | 8/2001 | Pan et al. | ............. | 710/301 |
| 6,993,618 B2 * | 1/2006 | Chen et al. | ............ | 710/305 |
| 7,934,037 B2 * | 4/2011 | Chou et al. | ........... | 710/301 |
| 2005/0190536 A1 * | 9/2005 | Anderson et al. | ........... | 361/686 |
| 2007/0136504 A1 * | 6/2007 | Wu | .............. | 710/302 |
| 2007/0294452 A1 * | 12/2007 | Chiu et al. | ........... | 710/300 |
| 2009/0248939 A1 * | 10/2009 | Lodolo et al. | ............ | 710/303 |

* cited by examiner

*Primary Examiner* — Mark Rinehart
*Assistant Examiner* — Trisha Vu
(74) *Attorney, Agent, or Firm* — Chun-Ming Shih

(57) ABSTRACT

A multimedia system includes a portable device, a multimedia expansion apparatus and a second display. The portable device further includes a main body and a first display coupling with the main body, in which the main body has a first multimedia module and a switch module. The multimedia further includes an expansion port for coupling the portable device, a multimedia switch circuit, a plurality of signal output ports and a power control circuit for energizing the expansion port, the multimedia switch circuit and the signal output ports. The second display is coupled with one of the signal output ports. The switch module forwards a multimedia signal of the main body to one of the first multimedia module and the multimedia switch circuit, and the power control circuit is to terminate power output to while the portable device is separated from the expansion port of the multimedia expansion apparatus.

12 Claims, 4 Drawing Sheets

MULTIMEDIA SYSTEM

This application claims the benefit of Taiwan Patent Application Serial No. 098135748, filed Oct. 22, 2009, the subject matter of which is incorporated herein by reference.

BACKGROUND OF THE INVENTION (1) Field of the Invention

The invention relates to a multimedia system, and more particularly to the multimedia system that is portable and expandable.

(2) Description of the Prior Art

The portable device featured in size and portability, such as the notebook computer, is popular in current business world. To be more compact, most of the components in the portable device exist in a built-in manner. Those built-in components include the display chipset, the sound card, and so on. An obvious advantage obtained from the built-in components is to reduce the size, but to sacrifice the convenience in replacement, expansion, and/or upgrading.

For professionals in computers, 3D-games and/or 3D-drawing, more advanced hardware for running some specific software is always needed. However, limited to the built-in components, while a need of an upgraded hardware is met, the portable device is usually forced to out-connect another advance portable device or an expansion so as to execute a desired software.

Referring now to FIG. 1, a conventional multimedia system 1 consisted of a portable device 11 and a multimedia expansion apparatus 13 is schematically shown.

As shown, the portable device 11 includes a main body 110 and a first display 112 coupling electrically with the main body 110. The main body 110 further includes thereinside a first multimedia module 114, a switch module 116 and a connector 118. The first multimedia module 114 further has a first display chipset and a first sound chipset (not shown in the figure). The connector 118 located on a bottom side of the main body 110 is the interface for connecting the multimedia expansion apparatus 13. The switch module 116 is to determine whether a multimedia signal generated by the main body 110 is to be forwarded to the first multimedia module 114 or to the multimedia expansion apparatus through the connector 118.

On the other hand, the multimedia expansion apparatus 13 provides an expansion platform 131 to set the portable device 11 and a connection port 133 on the platform 131 for receiving the connector 118 of the portable device 11. Further, the multimedia expansion apparatus 13 also provides various output ports 135, such as USB, RS232, IEEE1394 and PS2 connection ports, at a lateral side thereof to connect electrically and externally with a second display 139 through an appropriate cable. The multimedia expansion apparatus 13 is externally powered through a power cable 137.

Inside the multimedia expansion apparatus 13, a second multimedia module 132 and a power supply 134 are built in. The second multimedia module 132 includes further a second display card and a second sound card (not shown in the figure). The power supply 134 connected further to the power cable 137 is to energize the second multimedia module 132, the connection port 133 and the signal output ports 135.

Generally, the second multimedia module 132 is more advanced in functions than the first multimedia module 114, and also the second display 139 is usually larger than the first display 112. While the portable device 11 is set on the expansion platform 131 of the multimedia expansion apparatus 13, the multimedia signal of the main body 110 is sent, through the multimedia module 114, to the first display 112 by the switch module 116 if the first display 112 is ON, but to be switched to the second display 139 through the multimedia module 132 if the first display 112 is OFF (namely, unfolded onto the main body 110).

Nevertheless, the aforesaid arrangement has the following shortcomings.

A. In the art, while the portable device is separated from the conventional multimedia expansion apparatus, the power supply continues to energize the second multimedia module, the output ports and the connection ports. Thus, energy can't be saved while in this separate state.

B. The second multimedia module is not a hot-plugging element. While in need of replacing the display card or sound card, the corresponding apparatus needs to be shut down firstly, and thus the replacement is somehow inefficient.

C. When the multimedia system needs to output the multimedia signals to the second display, the first display is to unfold on the main body of the portable device, and thus the power button and the keypads on the main body are covered by the first display as well. In this circumstance, the first display needs to be folded from the main body while in ON/OFF operation of the main body.

D. When the portable device and the multimedia expansion apparatus are coupled, the power supply energizes the aforesaid devices at the same time. However, while the first display unfolds on top to the main body, the volume of the battery inside the portable device cannot be monitored by naked eyes.

Therefore, a multimedia system that can overcome the foregoing disadvantages is definitely welcome by the skill person in the art.

SUMMARY OF THE INVENTION

Accordingly, it is an object of the present invention to provide a multimedia system that can substantially save the energy.

It is another object of the present invention to provide a multimedia system that is capable of hot plugging.

It is a further object of the present invention to provide a multimedia system that has an additional ON/OFF button and a battery-volume detection button.

In the present invention, the multimedia system includes a portable device and a multimedia expansion apparatus.

The portable device includes a main body and a first display coupled with the main body. The main body has a connector located at one lateral side thereof, and a first multimedia module and a switch module both located inside the main body. The first multimedia module further includes thereinside a display chipset and a sound chipset.

The multimedia expansion apparatus has an expansion platform and an expansion port on the top thereof, and a plurality of signal output ports on a lateral side thereof. The signal output ports provide at least one thereof to couple a second display. Inside the multimedia expansion apparatus, a multimedia switch circuit and a power control circuit are included. In the case that the portable device is set on the expansion platform through a connection between the connector of the portable device and the expansion port of the multimedia expansion apparatus, the multimedia switch circuit is coupled with a first multimedia module and a repetitive controller in a hot-plugging manner, and the power control circuit is also used to energize the expansion port, the multimedia switch circuit and the signal output ports. At this time, through the coupling of the connector and the expansion port, the power control circuit would energize the portable device as well. In the case that the portable device is separated from the expansion platform, the power control circuit terminates the power output, such that the energy can be substantially saved.

In the present invention, the second multimedia module further includes a sound card and a display card.

Further, the multimedia expansion apparatus includes an ON/OFF button and a power-monitoring button on a top surface thereof. The ON/OFF button is used to control the power on/off of the portable device. The power-monitoring button is used to detect the power volume of the battery inside the portable device.

When the first display of the portable device is in a folded state with respect to the main body, the switch module would forward the multimedia signals of the main body to the first multimedia module for further processing, and then the processed multimedia signals are sent to the first display. On the other hand, when the first display is in an unfolded state with respect to the main body, the multimedia signals of the main body would be switched to the multimedia switch circuit. The multimedia switch circuit would determine to couple optionally with the second multimedia module or the repetitive controller.

In addition, in the case that the first display is unfolded on the main body, the preset ON/OFF button of the main body would be shielded by the first display. At this time, the ON/OFF button on the multimedia expansion apparatus would be introduced to perform the on/off control of the portable device. Also, the multimedia expansion apparatus can be used to recharge the portable device. While in recharging the portable device, upon when the portable device is in an off state of an unfolded state, the power-monitoring button of the multimedia expansion apparatus can be used to monitor the battery volume of the portable device. Further, the portable device may include a plurality of LED indicators at a lateral side thereof for revealing the battery volume of the portable device.

All these objects are achieved by the multimedia system described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a multimedia system. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
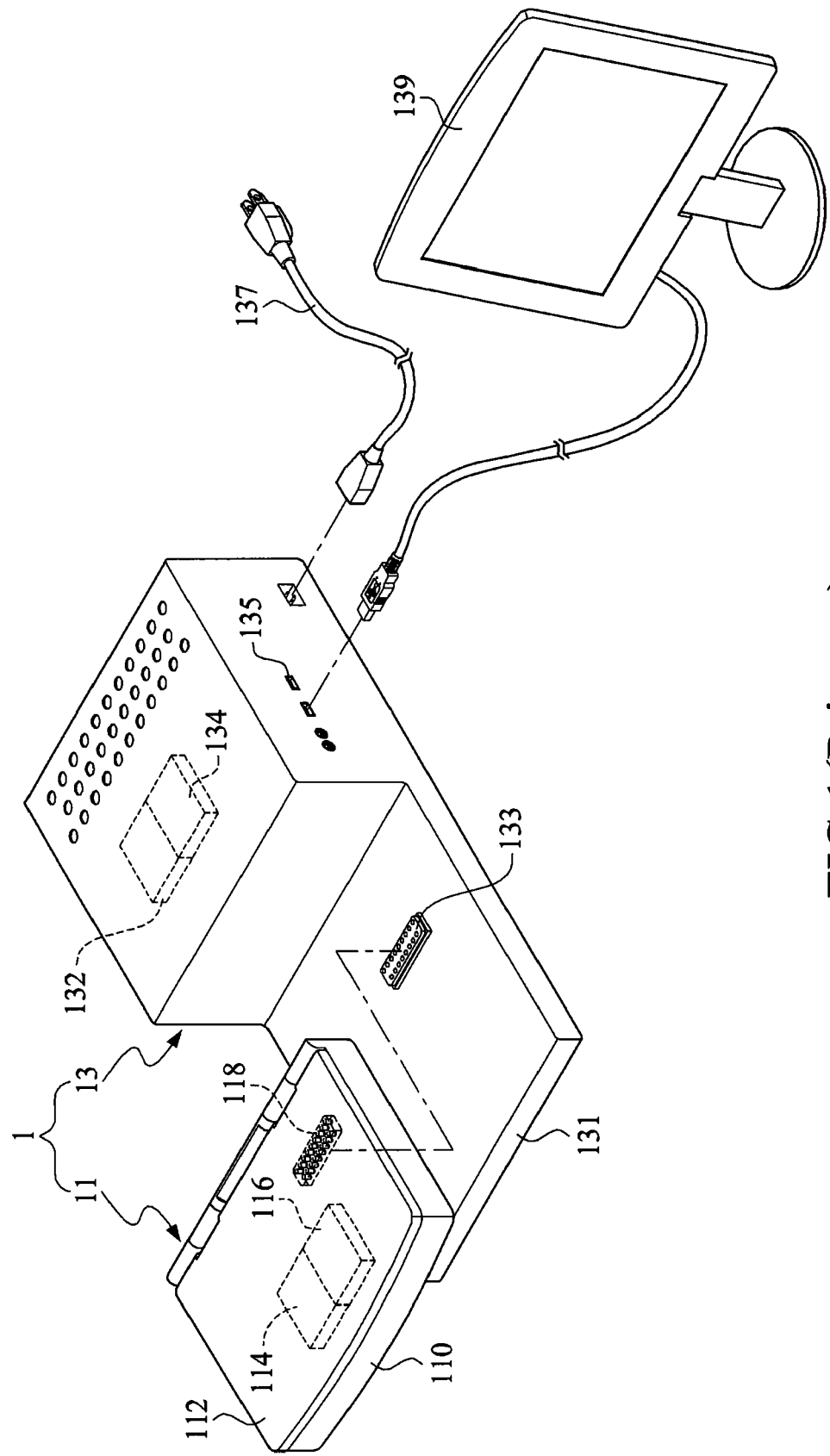
FIG. 1 is a schematic view of a conventional multimedia system.
Figure 2:
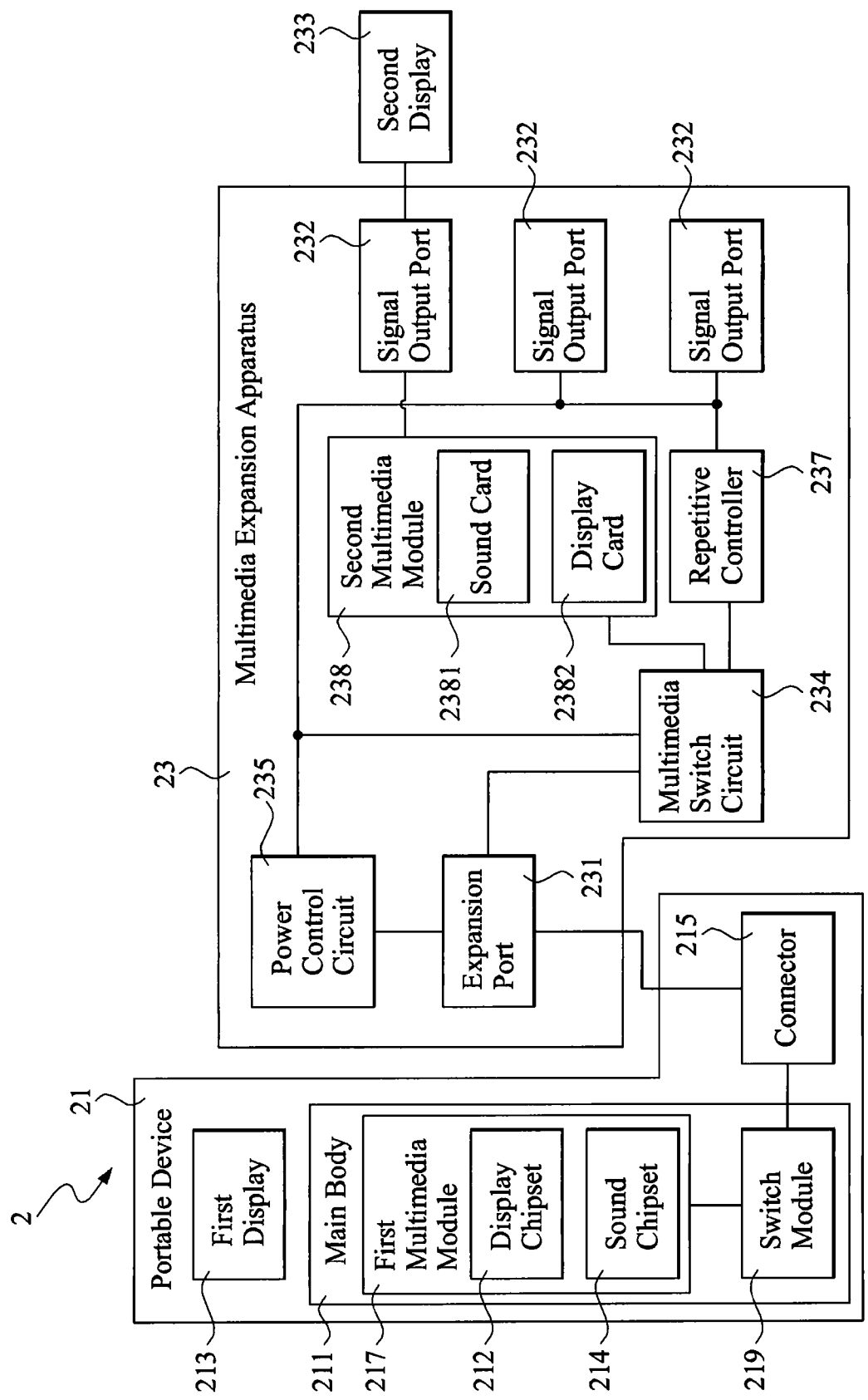
FIG. 2 is a block diagram of a preferred multimedia system in accordance with the present invention.

Referring now to FIG. 2, a block diagram of a preferred multimedia system 2 in accordance with the present invention is shown. The multimedia system 2 includes a portable device 21 and a multimedia expansion apparatus 23, in which the portable device 21 can be a notebook computer or any other mobile computing apparatus. The multimedia expansion apparatus 23, electrically coupled with the portable device 21, is introduced to enhance multimedia performance of the portable device 21.

As shown, the portable device 21 further has a main body 211 and a first display 213. The main body 211, coupled with the first display 213, further includes a connector 215 located at a lower lateral side thereof. Inside the main body 211, a first multimedia module 217 and a switch module 219 are built in. The first multimedia module 217 further includes a display chipset 212 and a sound chipset 214.

The multimedia expansion apparatus 23 has an expansion platform (not shown in the figure) and an expansion port 231 on a top thereof, and a plurality of signal output ports 232 on a lateral side thereof. The signal output ports 232 provide at least one thereof to couple externally a second display 233. Inside the multimedia expansion apparatus 23, a multimedia switch circuit 234, a power control circuit 235 and a repetitive controller 237 are included.

In the case that the portable device 21 is set on the expansion platform of the multimedia expansion apparatus 23, through an electrical engagement of the connector 215 of the portable device 21 and the expansion port 231 of the multimedia expansion apparatus 23, multimedia signals generated by the main body 211 can be sent to the multimedia switch circuit 234. The multimedia switch circuit 234 may has a PCI Express interface to couple with a second multimedia module 238 and the repetitive controller 237 in a hot-plugging manner. In the present invention, the second multimedia module 238 further includes a sound card 2381 and a display card 2382. The power control circuit 235 is used to energize the expansion port 231, the multimedia switch circuit 234 and the signal output ports 232. At this time, through the coupling of the connector 215 and the expansion port 231, the power control circuit 235 would energize the portable device 21 as well. However, in the case that the portable device 21 is separated from the expansion platform of the multimedia expansion apparatus 23, the power control circuit 235 would terminate the power output, such that the energy can be substantially saved at the end of the multimedia expansion apparatus 23.

Figure 3A:
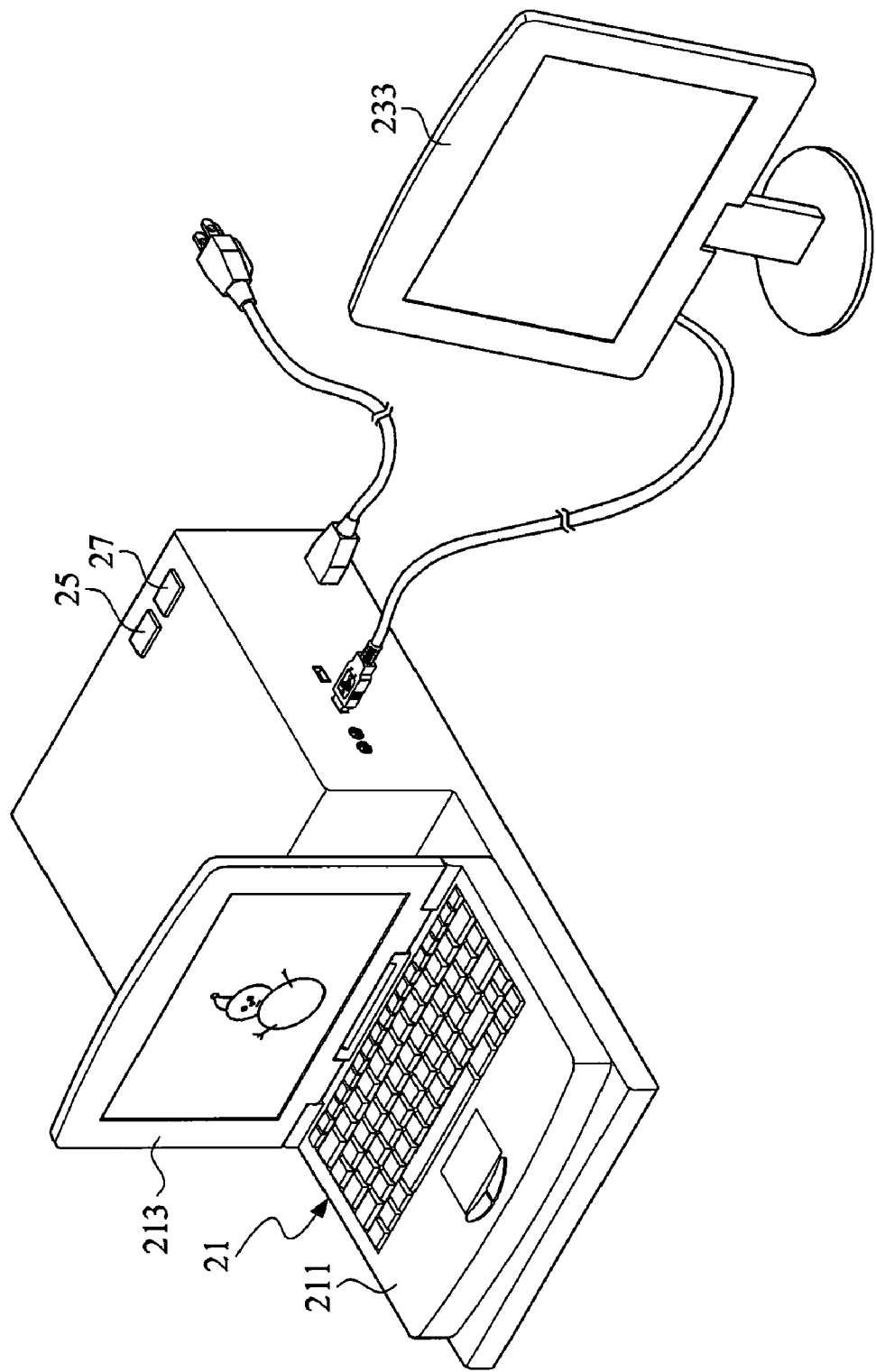
FIG. 3A shows an operational state of the preferred multimedia system of FIG. 2, in which the portable device is in a folded state.
Figure 3B:
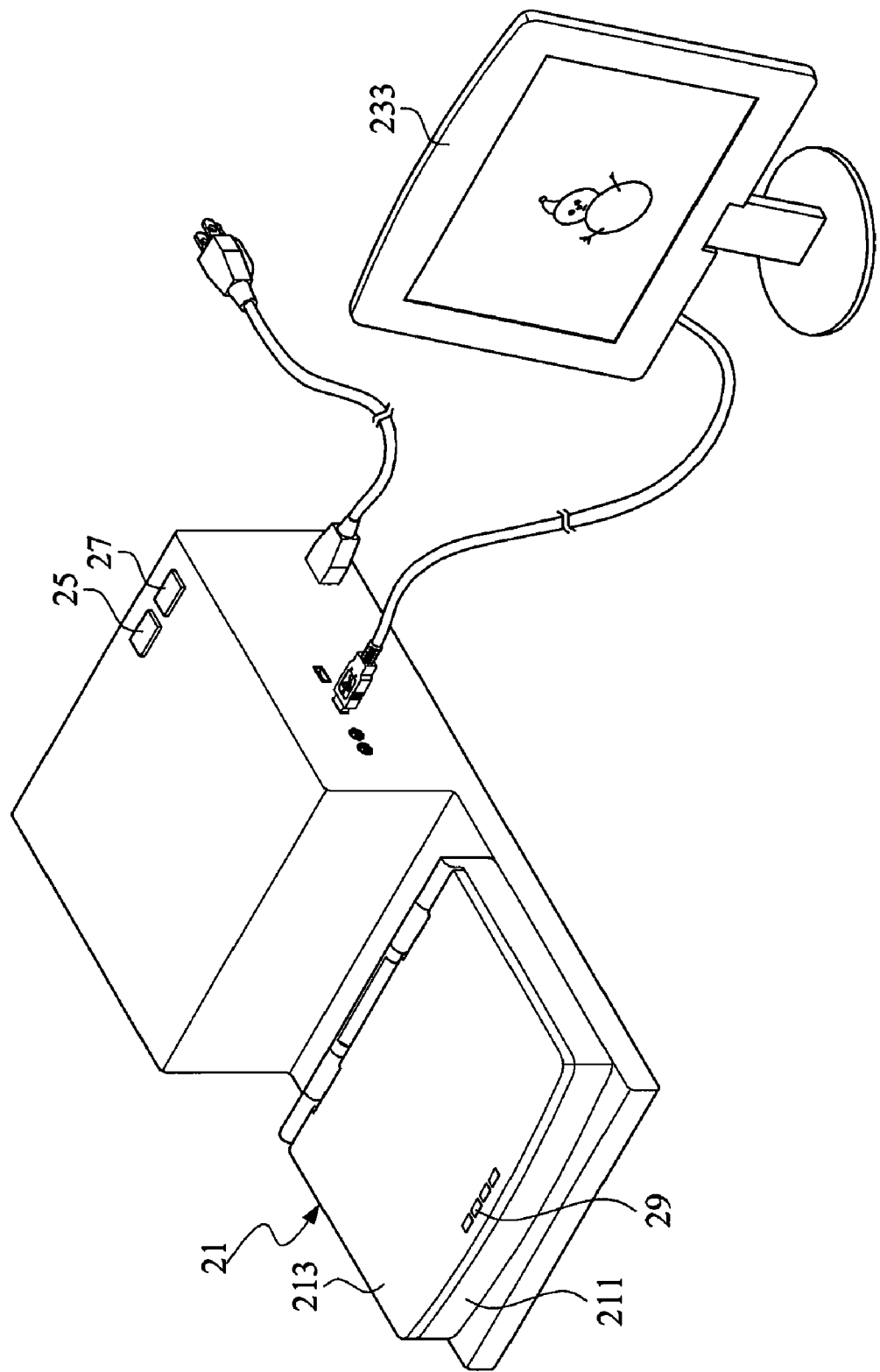
FIG. 3B shows another operational state of the preferred multimedia system of FIG. 2, in which the portable device is in an unfolded state.

Referring now to FIG. 3A and FIG. 3B, two operational states of the preferred multimedia system of FIG. 2 are shown, respectively; one of which the portable device is in a folded state, while another of which the portable device is in an unfolded state. The multimedia expansion apparatus 23 may include an ON/OFF button 25 and a power-monitoring button 27 on a top surface thereof. The ON/OFF button 25 provides a user to control the power on/off of the portable device 21 away from the portable device 32. The power-monitoring button 27 is used to detect the power volume of the battery inside the connected portable device 21.

Referring also to FIG. 2, in the case the first display 213 of the portable device 21 is in a folded state with respect to the main body 211, the switch module 219 would forward the multimedia signals of the main body 211 to the first multimedia module 217 for further processing, and then the processed multimedia signals are sent to the first display 217. On the other hand, in the case that the first display 213 is in an unfolded state with respect to the main body 211, the multimedia signals of the main body 211 would be switched to the multimedia switch circuit 234. The multimedia switch circuit 234 would then determine to couple optionally with the second multimedia module 238 or the repetitive controller 237 for further processing the multimedia signals.

In the present invention, the multimedia switch circuit 234 may provide an application program in a software manner for the user to determine whether the multimedia signals are sent to the second multimedia module 238 or the repetitive controller 237 for further processing. Alternatively, in a hardware manner, a single port can also be provided for engaging the second multimedia module 238 or the repetitive controller 237 to further process the multimedia signals.

Referring again to FIG. 3B, in the case that the first display 213 is unfolded on the main body 211, the preset ON/OFF button of the main body 211 would be shielded by the first display 213. At this time, the ON/OFF button 25 on the multimedia expansion apparatus 23 would be introduced to perform the on/off control of the portable device 21. Also, the multimedia expansion apparatus 23 can be used to recharge the portable device 21. While in recharging the portable device 21, whether the portable device 21 is in an off state or an unfolded state with the firs display 213 shielding on top of the main body 211, the power-monitoring button 27 of the multimedia expansion apparatus 23 can be used to monitor the battery volume of the portable device 21. Further, the portable device 21 may include a plurality of LED indicators 29 at an appropriate side (the upper side as shown for example) thereof for revealing the battery volume of the portable device 21.

In the present invention, the switch module 219 may output the multimedia signals of the main body 211 simultaneously to both the first multimedia module 217 and the multimedia control circuit 234 for further processing, no matter whether or not the first display 213 is unfolded on the main body 211.

By introducing the multimedia system of the present invention, following advantages can be obviously obtained.

A. While the portable device is separated from the conventional multimedia expansion apparatus, the power control circuit of the multimedia expansion apparatus can terminate the energy supply to the multimedia control circuit, the output ports and the connection ports. Thus, energy can be substantially saved.

B. The multimedia switch circuit of the present invention is a hot-plugging element. While in need of replacing the display card or sound card, the corresponding apparatus needn't to be shut down, and thus the replacement work can be somehow efficient.

C. For the addition of a repetitive controller in the multimedia expansion apparatus of the present invention, the output of the multimedia signals of the main body can be enhanced, and thus the signal quality of the system can be further ensured.

D. With the help of the ON/OFF button at the multimedia expansion apparatus for controlling on/off of the portable device, even when the first display is unfolded on the main body of the portable device, the on/off operation of the portable device can still be performed.

E. By introducing the power-monitoring button at the multimedia expansion apparatus, the battery volume of the portable device can also be observed no matter whether the portable device is in the folded state or the unfolded state.

While the present invention has been particularly shown and described with reference to a preferred embodiment, it will be understood by those skilled in the art that various changes in form and detail may be without departing from the spirit and scope of the present invention.

We claim:

1. A multimedia system, comprising:
a portable device having a main body and a first display coupling with the main body, the main body further having a first multimedia module and a switch module, the portable device further including a battery and a plurality of LED indicators for revealing the battery volume;
a multimedia expansion apparatus having an expansion port for coupling the portable device, a multimedia switch circuit, a plurality of signal output ports and a power control circuit, the multimedia switch circuit coupling with a second multimedia module and a repetitive controller, the power control circuit being to energize the expansion port, the multimedia switch circuit and the signal output ports, the multimedia expansion apparatus further including a power-monitoring button for detecting the battery volume; and
a second display coupled with one of the signal output ports of the multimedia expansion apparatus;
wherein, the switch module forwards a multimedia signal of the main body to one of the first multimedia module and the multimedia switch circuit, and then the multimedia switch circuit determines optionally to couple the second multimedia module and/or the repetitive controller;
wherein, the power control circuit is to terminate power output while the portable device is separated from the expansion port of the multimedia expansion apparatus.

2. The multimedia system according to claim 1, wherein said first multimedia module further has a built-in display chipset and a built-in sound chipset.

3. The multimedia system according to claim 1, wherein said second multimedia module further has a display card and a sound card, both for coupling said multimedia switch circuit in a hot-plugging manner.

4. The multimedia system according to claim 1, wherein said multimedia switch module is a PCI Express interface.

5. The multimedia system according to claim 1, wherein said multimedia expansion apparatus further includes an ON/OFF button for controlling on/off of said portable device.

6. A multimedia system, comprising:
a portable device having a main body and a first display coupling with the main body, the main body further having a first multimedia module and a switch module, the portable device further including a battery and a plurality of LED indicators for revealing the battery volume;
a multimedia expansion apparatus having an expansion port for coupling the portable device, a multimedia switch circuit, a plurality of signal output ports and a power control circuit, the power control circuit being to energize the expansion port, the multimedia switch circuit and the signal output ports, the multimedia expansion apparatus further including a power-monitoring button for detecting the battery volume; and
a second display coupled with one of the signal output ports of the multimedia expansion apparatus;
wherein, the switch module forwards a multimedia signal of the main body to one of the first multimedia module and the multimedia switch circuit, and the power control circuit is to terminate power while the portable device is separated from the expansion port of the multimedia expansion apparatus.

7. The multimedia system according to claim 6, wherein said first multimedia module further has a built-in display chipset and a built-in sound chipset.

8. The multimedia system according to claim 6, wherein said multimedia expansion apparatus further includes a second multimedia module coupled with said multimedia switch circuit.

9. The multimedia system according to claim 8, wherein said second multimedia module further has a display card and a sound card, both for coupling said multimedia switch circuit in a hot-plugging manner.

10. The multimedia system according to claim 6, wherein said multimedia expansion apparatus further includes a repetitive controller coupled with said multimedia switch module.

11. The multimedia system according to claim 6, wherein said multimedia switch circuit is a PCI Express interface.

12. The multimedia system according to claim 6, wherein said multimedia expansion apparatus further includes an ON/OFF button for controlling on/off of said portable device.

* * * * *